Dec. 29, 1931.  C. OVERSTREET  1,838,785

SAWBLADE FOR CUTTING MEAT AND BONE

Filed May 31, 1930

INVENTOR
C. OVERSTREET
BY
ATTORNEYS

Patented Dec. 29, 1931

1,838,785

UNITED STATES PATENT OFFICE

COLEMAN OVERSTREET, OF HOLLYWOOD, CALIFORNIA

SAWBLADE FOR CUTTING MEAT AND BONE

Application filed May 31, 1930. Serial No. 457,735.

My invention relates to a blade for cutting meat and bone.

It is the present practice in meat shops and the like when it is desired to cut through a piece of meat and bone to either cut through the soft meat portions with a knife down to the bone and then cut through the bone with a meat saw, or the piece of meat and bone is subjected to the cutting action of a saw, usually of the endless type, which cuts through both the soft meat portions and the bone. The use of such a saw is objectionable for the reason that it often burns the meat and makes a smeary cut in spreading particles of bone over the cut surface of the meat.

It is an object of this invention to combine the edge of a knife with the teeth of a saw in the same cutting blade so that the soft portions of the meat as well as the bone may be quickly and conveniently cut by the cutting edge and the saw teeth, respectively, as required. By the use of my improved cutting blade the disadvantages above referred to are either obviated or minimized; furthermore, the use of such a blade reduces the cutting noise to a great extent, and also avoids the pulling of the ends of soft meat out of shape.

My invention consists in the construction and arrangement of parts hereinafter described and claimed.

In the accompanying drawings, which form a part of this specification, I have illustrated a preferred embodiment of my invention, and in which:—

Figure 2:
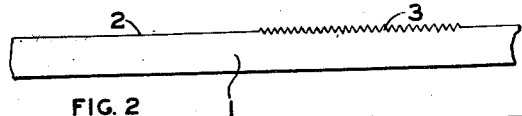
Fig. 2 is a portion of a blade in side elevation.
Figure 1:
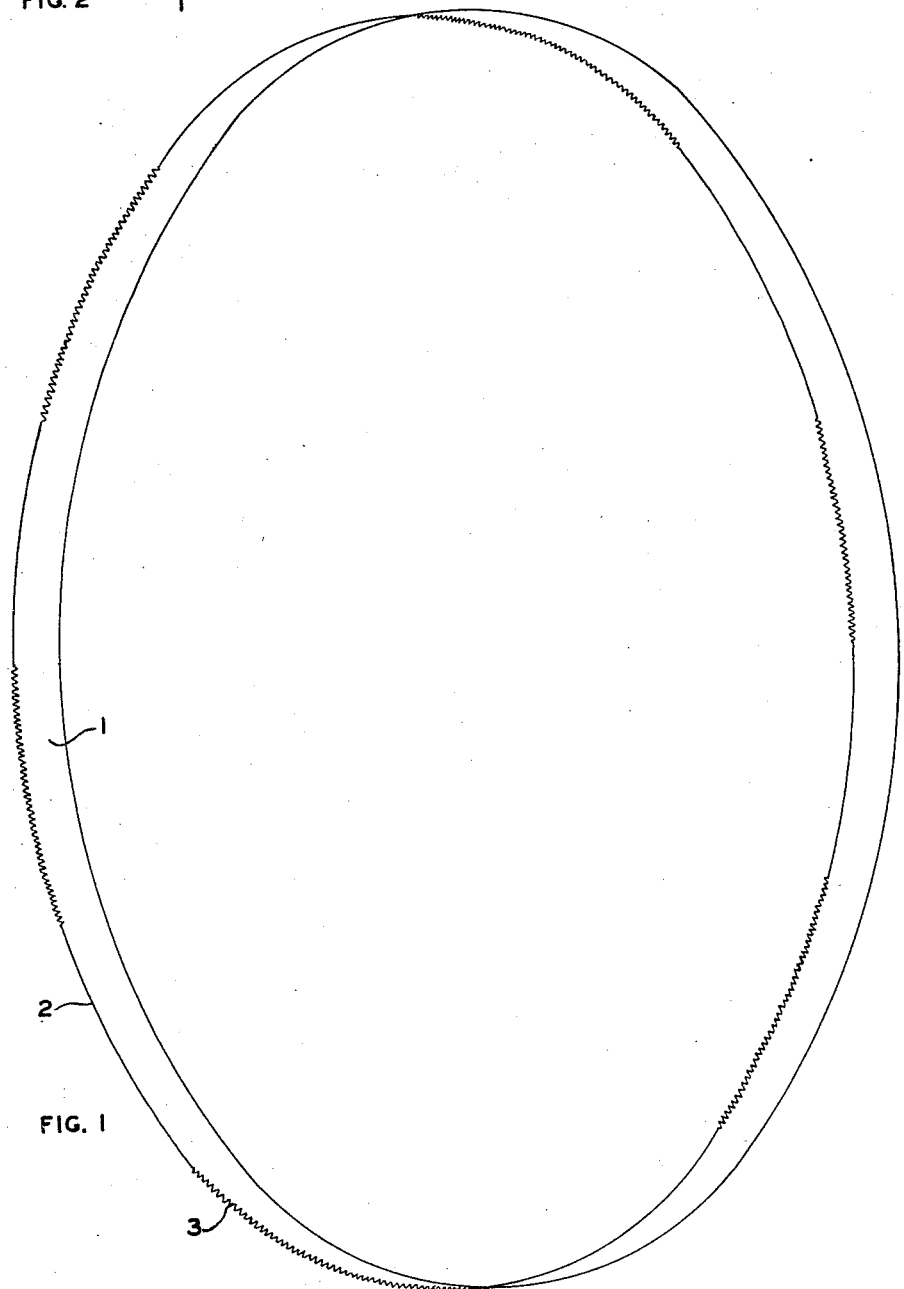
Fig. 1 is a perspective view of a cutting blade of the endless type.

Referring to the drawings:

1 indicates a flexible, steel band which is divided with knife-edge sections 2 alternating with saw-teeth sections 3. The length of these sections may be varied, but I find a length of four to five inches gives excellent results. The teeth of the section 3 project slightly above the plane of the knife edges 2, as clearly shown in Fig. 2. It will be understood that the blade embodying my invention may be substituted for the saw blade in the ordinary meat cutter's saw.

In the use of the blade when substituted for the ordinary saw-tooth blade in the meat cutter's saw, the operator may use the knife-edge 2 for cutting the soft portions of the meat and the saw-tooth section 3 for cutting through the bone. When the endless cutting blade is used in any of the machines using endless blades my improved cutting blade will quickly and smoothly cut both the soft portions of the meat and the bone with a minimum of noise and spreading of particles of bone over the cut surfaces of the meat. It will also avoid the burning of the meat or the pulling of the edges out of shape.

Various changes may be made by those skilled in the art in the steps of method without departing from the spirit of the invention as claimed.

I claim:

A meat and bone cutter comprising a metal blade band having a cutting edge composed of alternately arranged knife and saw tooth formations, the saw tooth formations comprising a series of teeth arranged uniformly in a row and spaced from adjacent formations at either side by a knife portion, said teeth projecting outwardly beyond the surface of the knife portion, whereby the teeth are adapted to engage and operate upon bone structure prior to the time the knife contacts with the meat.

In testimony whereof I have signed my name to this specification.

COLEMAN OVERSTREET.